United States Patent Office 3,395,580
Patented Aug. 6, 1968

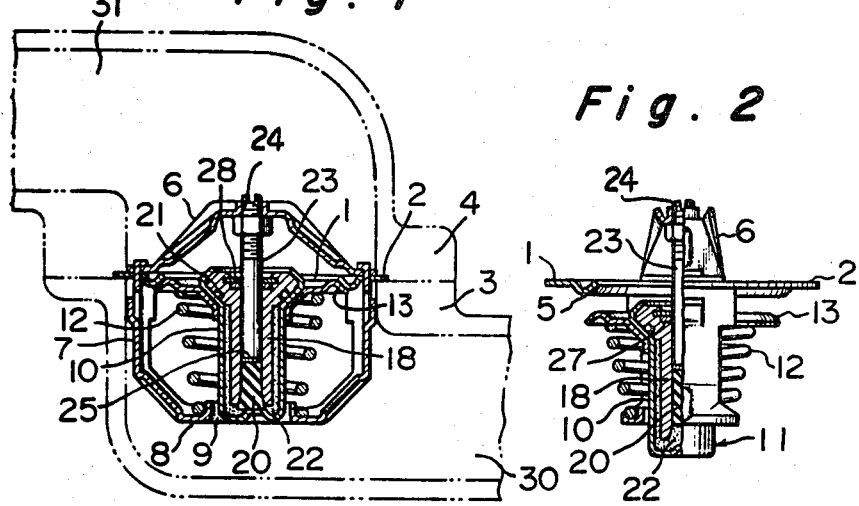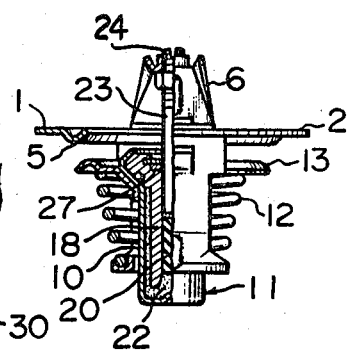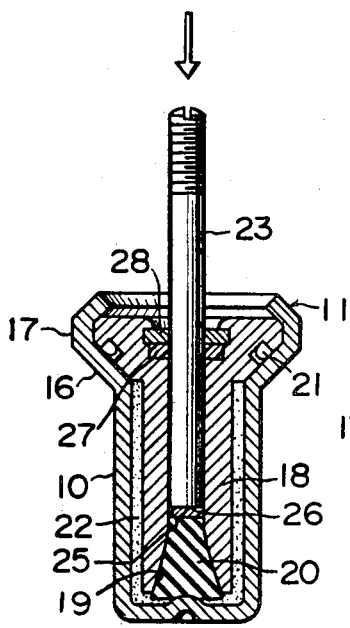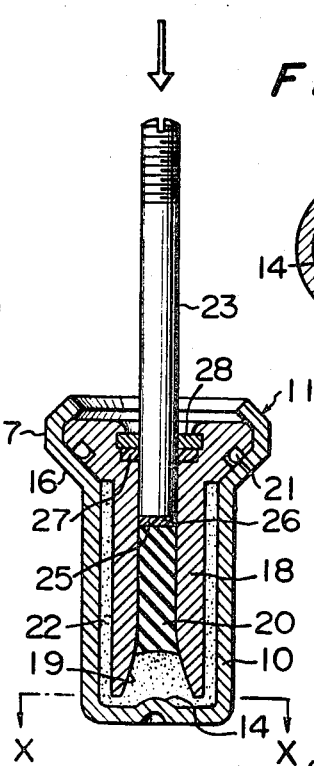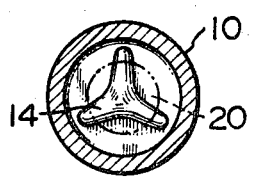

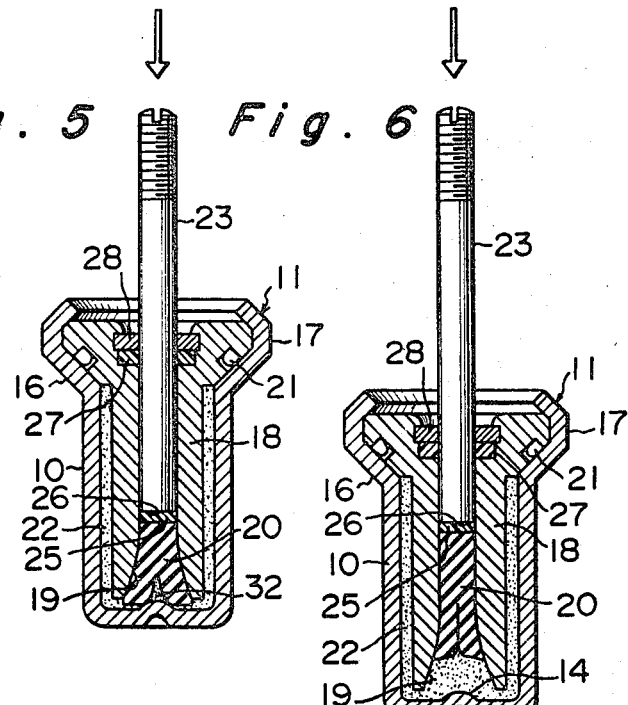
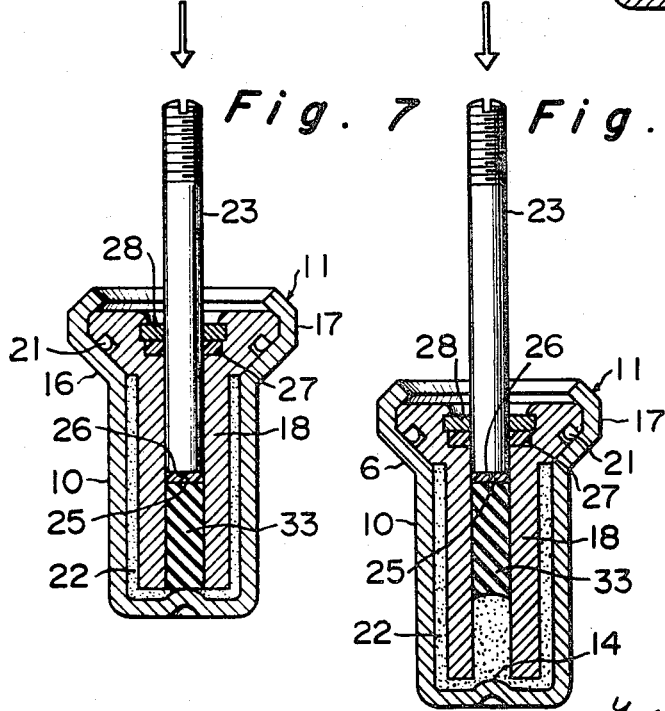

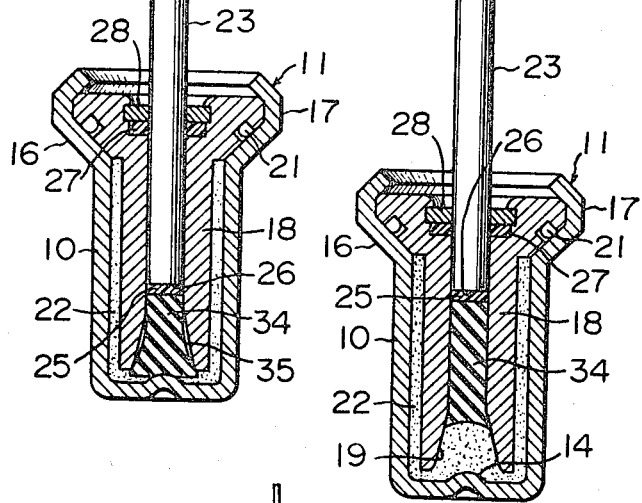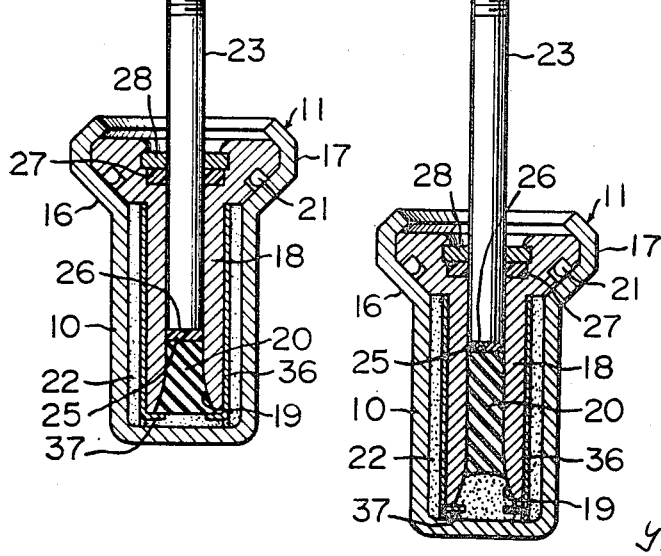

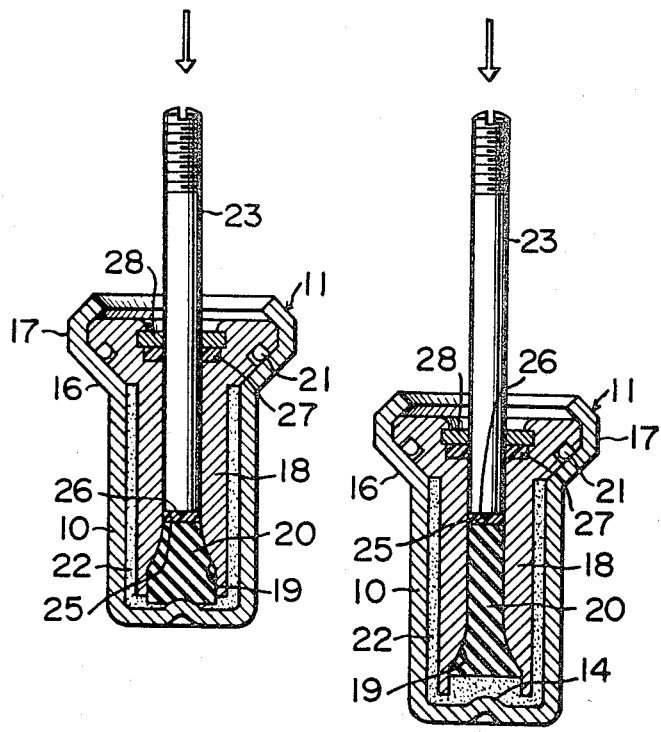

3,395,580
THERMOSTAT
Yoshikazu Kuze, 3-Go, 31-Ban, 1-chome, Magome, Higashi, Ota-ku, Tokyo, Japan
Filed May 4, 1966, Ser. No. 547,631
Claims priority, application Japan, May 13, 1965, 40/27,749; June 17, 1965, 40/35,760; July 21, 1965, 40/43,651; Oct. 11, 1965, 40/61,901
11 Claims. (Cl. 73—368.3)

ABSTRACT OF THE DISCLOSURE

A thermostat having an outer heat-sensitive chamber and an open-ended guide means mounted therein in a fixed, spaced relationship. Valve actuation means, including a push rod and rubber-like sealing plug, is slidably and sealingly mounted in the guide means. A wax-like thermal responsive substance is sealed in and fills the space between the chamber and guide means and is in communication with the sealing plug. When the thermostat is heated, the wax-like substance expands to exert a compressive force on the sealing plug to push the push rod out of the guide means and thereby actuate the associated valve.

This invention relates to a thermostat particularly adapted for use in the cooling systems of automobile engines.

One object of this invention is to provide an improved slidable sealing means which will bring extraordinary durability and long life to the present thermostat.

Another object of this invention is to provide a thermostat wherein the valve remains open even when the durability of the thermostat comes to an end. This function has been impossible in all prior wax-type thermostats.

A further object of this invention is to provide a thermostat wherein a wax or wax-like thermal responsive substance is distributed as thinly as possible along the entire inner surface of an elongated tubular cylindrical chamber, and when the wax is heated by the engine coolant, it expands, exerting a force upon the rubber or rubber-like sealing plug which is tightly urged into sealing engagement with the metallic guide member and thereby brings extraordinary thermal sensibility to the present thermostat.

Further, another object of this invention is to provide a thermostat wherein the center push rod is entirely free from any lateral force or pressure due to the expanding wax or wax-like substance inside the chamber.

Still another object of this invention is to provide a method by which the rubber or rubber-like sealing plug never unndergoes severe deformation.

Yet a further object of this invention is to inhibit aging by minimizing the mass of the rubber or rubber-like sealing plug as much as possible.

Other objects and advantages will become more readily apparent upon proceeding with the following description and with reference to the accompanying drawings wherein:

FIG. 1 is a longitudinal sectional view of a thermostat according to the present invention;

FIG. 2 shows a thermostat according to the invention with its side elevation partially in section and with the valve open;

FIGS. 3 and 4 are sectional views illustrating the operation of the thermal sensitive element shown in FIGS. 1 and 2;

FIGS. 5 and 6 are sectional views illustrating the operation of a second embodiment of the thermal sensitive element;

FIGS. 7 and 8 are sectional views illustrating the operation of a third embodiment of the thermal sensitive element.

FIGS. 9 and 10 are sectional views illustrating the operation of a fourth embodiment of the thermal sensitive element;

FIGS. 11 and 12 are sectional views illustrating the operation of a fifth embodiment of the thermal sensitive element;

FIGS. 13 and 14 are sectional views illustrating the operation of a sixth embodiment of the thermal sensitive element; and FIG. 15 is a sectional view taken along a line X—X in FIG. 4 and illustrates a projection formed at the inner bottom surface of the heat-sensitive chamber.

In the embodiment of the invention illustrated in FIG. 1, a housing 1 having an annular flange 2 extending thereabout is adapted as a sealing connection between the cylinder head 3 of an internal combustion engine and the hose fitting 4 leading to the radiator in a well-known manner. The housing 1 terminates in an annular valve seat 5 having a fluid port therethrough. Positioned on one side surface thereof is an arcuately formed bridge member 6.

Extending from the flange 2 opposite to the arcuately formed bridge member 6, there is a supporting member 7 having diametrically spaced arms rigidly secured to the flange 2 together with the arcuately formed bridge member 6.

The support member 7 includes a bridge 8 having a central guide aperture 9 therein through which slidably extends a thermal conductive chamber 10 of a thermal sensitive element 11. A compression spring 12 is shown as being seated on the bridge 8 and as abutting the undersurface of a movable valve 13 attached to the thermal sensitive element 11 substantially concentric therewith.

It will be noted that the compression spring 12 constantly urges the movable valve 13 towards engagement with the valve seat 5. The thermal sensitive element 11 has an outside wall formed by an elongated tubular cylindrical thermal conductive chamber 10 which has a free sliding fit in the guide aperture 9. The chamber 10 is provided with a projection 14 (FIG. 15) at the inner bottom surface where the thermal conductivity is most effective. The other end of said chamber 10 has a head portion formed by an outward extending tapered flange 16 and upstanding flange 17. Within the chamber 10 is a metallic guide member 18 which is provided with a centrally located longitudinal opening throughout and at its lower-end opening in a funnel-shaped portion 19. A rubber or rubber-like deformable resilient plug 20 is fitted to said funnel-shaped portion 19 in the metallic guide member 18. A head portion of said guide member 18 is clamped in position for clamping and sealing rigidity secured to the chamber 10 through O-ring 21.

It will be noted that the rubber or rubber-like plug 20 is constantly urged into sealing engagement with the inner wall of the metallic guide member 18 by means of the projection 14 at the inner bottom surface of the chamber 10 and assures the formation of a positive fluid-tight seal at this portion. A thermal responsive expansible wax or wax-like substance 22 is retained between the chamber 10 and the guide member 18.

Positioned within the longitudinal opening in the metallic guide member 18 is a push-rod 23 which extends upwardly upon expansion of the wax or waxlike substance 22, the latter acting to move the rubber or rubber-like plug 20 along the inner wall of the metallic guide member 18, and thereby forcing the push-rod 23 to move extendingly from the thermal conductive chamber 10. The upper end of the push-rod 23 is slidably retained within a screw member 24 and screwed to the center of the arcuately formed bridge member 6. An anti-chafing disk 25 formed of a wear-resistant soft plastic material is seated on the rubber or rubber-like plug 20 and acts, in turn, as a seat for the innermost end 26 of the push-rod 23. A ring seal 27 is interposed between a closure disk 28 and the recess of the guide member 18 and serves as a positive fluid-tight seat therebetween.

The operation of this invention is as follows:

Referring to FIG. 1 the subject thermostat is shown installed between the cylinder head 3 and the hose fitting 4. When the thermostat is so positioned, it will be noted that the thermal sensitive element 11 of the thermostat projects downwards into the coolant conduit 30 where it is always exposed to the fluid flow therein. This structural arrangement enables the wax or wax-like substance in thermal conductive chamber 10 to instantaneously and accurately reflect the variations in temperature of the fluids passing through conduit 30.

It will also be noted that, when the compression spring 12 has moved the valve member 13 to the position shown in FIG. 1, the passage of fluid between conduit 30 and 31 will be prevented by the engagement of the valve member 13 with valve seat 5. When the fluid temperature of the conduit 30 reaches the predetermined operating temperature, the wax or wax-like substance 22 will expand in changing from a solid to a liquid state. The rubber or rubber-like plug 20 is employed for transmitting the force created by said wax or wax-like substance in expanding, thereby bodily moving the thermal element 11 against the action of the spring 12 (FIG. 2). The rubber or rubber-like plug 20 is deformed inwardly during this movement.

The movement of the thermal responsive expansible wax 22 will compress the spring 12 and positively move the valve 13 away from its seating engagement with the valve seat 5 so that free flow of cooling fluid can take place through the housing 1 into the manifold conduit 31.

If the temperature of the fluid in conduit 30 should decrease after the valve member 13 has been moved to the open position, the temperature of the wax or wax-like substance is likewise reduced thereby effecting a reduction in volume. Therefore, the push-rod 23 is withdrawn into the metal guide member 18 as the spring 12 returns the valve 13 towards its closed position. Since lateral pressure is not applied to push-rod 23, as in the case of common wax or wax-like substances or the rubber cylinder-like type of thermostats and furthermore since the push rod is protected by the metallic guide member 18 for its movement, the frictional loss is almost negligible.

Further, the wax or wax-like substance is filled into the uniform and narrow space defined between the elongated tubular cylindrical thermal conductive chamber 10 and the metallic guide member 18. The movement, due to the expadning wax or wax-like substance, acts in an axial direction of the deformable resilient plug 20 which will be tightly urged into sealing engagement with the metallic guide member 18. The thermal sensitivity of the inventive thermostat is thus greatly improved.

Furthermore, due to the provision of the projection 14 at the inner bottom of the thermal conductive chamber, the pressure receiving area of the rubber or rubber-like plug 20 is initially small but becomes abruptly larger when the plug 20 is moved upwardly. At the same time, the wax which has been prevented from flowing between the contact surface of the plug 20 and the projection 14 is permitted to flow, and the heat receiving area is enlarged accordingly, the valve is abruptly opened, whereby the water hammer phenomenon can be reduced or relieved.

According to the present invention, it has now become possible for the valve to remain open when the durability of the rubber or rubber-like plug comes to an end. This function has been impossible in the conventional wax-type thermostats. It is accomplished in the invention by the fact that the rubber-like plug 20 ages and changes in quality as it slides reciprocally within the guide member 18 year after year under high temperature and high pressure. Finally, the frictional resistance between the plug 20 and the guide member 18 will be so increased that the return spring cannot overcome the frictional resistance. Thus, the valve is kept open.

A second embodiment of the present invention is illustrated in FIGS. 5 and 6 wherein a blind bore 32 is provided at the lower center of the enlarged portion of the rubber-like sealing plug 20. With this arrangement the frictional resistance produced between the rubber-like sealing plug 20 and the wall of the guide member is lessened.

A third embodiment of the present invention is illustrated in FIGS. 7 and 8 wherein the guide member 18 is provided with a longitudinal opening throughout, and a straight sealing plug 33 is fitted therein. With this arrangement the frictional resistance between the rubber-like sealing plug 33 and the wall of the guide member is greatly lessened.

A fourth embodiment of the present invention is illustrated in FIGS. 9 and 10 wherein a rubber-like sealing plug 34 is engaged with the funnel-shaped open portion of the guide member, and both end portions of the plug 34 are engaged with the guide member, the intermediate portion of the plug defining a clearance 35. With this arrangement the frictional resistance between the plug 34 and the guide member 18 is also lessened.

A fifth embodiment of the present invention is illustrated in FIGS. 11 and 12 wherein an open-ended sleeve 36 is fitted to the guide member 18 and on one end portion is provided with a partially in-turned flange 37 which creates the sealing force between the wall of the guide member and the rubber-like sealing plug 20.

A sixth embodiment of the present invention is illustrated in FIGS. 13 and 14 wherein the lower end of the guide member forming the funnel-shaped portion 19 includes a recess having vertical walls surmounted by a bell-shaped portion. The latter portion forms the restriction to resist the deformation of the rubber-like sealing plug 20

It will be understood that modifications and variations of the present invention may be effected without departing from the spirit and scope of the novel concept thereof.

What is claimed is:

1. A thermostat comprising an outer heat-sensitive chamber, an open-ended guide means fixedly mounted within the walls of said chamber spaced from the walls thereof, a rubber-like sealing plug slidably and sealingly inserted in one end of said guide means and a push rod inserted in the other end of said guide member and engaging with said plug, a wax-like substance sealed within and substantially filling said space between said chamber and said guide means and beneath the open end of said guide means to communicate with said rubber-like sealing plug, means adjacent the one end of said guide means for exerting a force against said plug biasing it into sealing relationship with said guide means, whereby upon being heated, said wax-like substance becomes more liquid and expands to exert a compressive force on the lower end of said rubber-like sealing plug moving it away from said last mentioned means to thus push said push rod out of said guide means.

2. A thermostat as claimed in claim 1 in which the rubber-like sealing plug extends out of one end of said guide member and towards the walls of said chamber to seal the wax-like substance therebetween.

3. A thermostat as claimed in claim 1 in which the means adjacent the one end of said guide means comprises a projection formed at an inner bottom surface of said chamber, said rubber-like sealing plug being seated on said projection to create said sealing force between the walls of said guide member and said rubber-like sealing plug.

4. A thermostat as claimed in claim 1 in which a valve is fixedly mounted on said heat-sensitive chamber, the push rod being held immobile and the expansion of said wax-like substance causing said heat-sensitive chamber to move downwardly to open said valve, which is mounted in the water manifold of an internal combustion engine.

5. A thermostat as claimed in claim 1 in which a housing surrounds said heat-sensitive chamber, and a by-pass valve for controlling the flow of cooling water in said housing, being operatively connected to said thermostat.

6. A thermostat as claimed in claim 1 in which the guide member is provided with a longitudinal opening in the shape of a funnel which makes sealing engagement with said rubber-like sealing plug.

7. A thermostat as claimed in claim 1 in which said rubber-like sealing plug is provided with a blind bore at the lower center of an enlarged portion.

8. A thermostat as claimed in claim 1 in which the guide means is provided with a longitudinal opening throughout and a straight sealing plug fittted therein.

9. A thermostat as claimed in claim 6 in which said rubber-like sealing plug is engaged with said funnel-shaped open portion of said guide means and both end portions of said plug are engaged with said guide means while the intermediate portion thereof defines a clearance.

10. A thermostat as claimed in claim 1 in which said means adjacent the one end of said guide means comprises an open-ended sleeve means fitted to said guide means and one end portion thereof is provided with a partially in-turned flange which creates the sealing force between the walls of said guide means and the rubber-like sealing plug.

11. A thermostat especially for actuating valve means within a water manifold of an internal combustion engine comprising heat-sensitive chamber means mounted within said manifold and operatively connected to said valve means, guide means fixedly mounted within and spaced from the walls of said chamber, a bore in said guide means, a rubber-like sealing plug slidably and sealingly inserted into one end of said bore, means adjacent said one end of said bore for exerting a force on said plug biasing it into sealing relationship with said bore, push-rod means one end of which is inserted into the other end of said bore to engage with said plug therein, the other end of said push-rod means being fixedly mounted to said water manifold, a thermal responsive expansive substance substantially filling said space between said chamber means and said guide means and being sealed therein, said thermal responsive expansion substance communicating with said plug, said substance, when heated, expanding to exert a force on said plug moving it away from said biasing means and to force said push rod from said bore thereby actuating said valve means.

References Cited
UNITED STATES PATENTS

| | | | |
|---|---|---|---|
| 3,001,401 | 9/1961 | Vernet et al. | 73—368.3 XR |
| 3,231,194 | 1/1966 | Yoshikazu Kuze | 73—368.3 XR |
| 3,234,793 | 2/1966 | Vernet | 73—368.3 |

FOREIGN PATENTS

| | | |
|---|---|---|
| 1,388,402 | 11/1964 | France. |

S. CLEMENT SWISHER, *Acting Primary Examiner.*

WILLIAM HENRY II, *Assistant Examiner.*